(12) United States Patent
Higgins et al.

(10) Patent No.: US 8,021,635 B2
(45) Date of Patent: Sep. 20, 2011

(54) COMBUSTION FURNACE HUMIDIFICATION DEVICES, SYSTEMS AND METHODS

(75) Inventors: Brian S. Higgins, Raleigh, NC (US); Goran Moberg, Gothenburg (SE)

(73) Assignee: Nalco Mobotec, Inc., Naperville, IL (US)

( * ) Notice: Subject to any disclaimer, the term of this patent is extended or adjusted under 35 U.S.C. 154(b) by 30 days.

(21) Appl. No.: 12/714,793

(22) Filed: Mar. 1, 2010

(65) Prior Publication Data

US 2010/0159406 A1 Jun. 24, 2010

Related U.S. Application Data

(60) Division of application No. 10/757,056, filed on Jan. 14, 2004, now Pat. No. 7,670,569, which is a continuation-in-part of application No. 10/461,735, filed on Jun. 13, 2003.

(51) Int. Cl.
 *B01D 53/56* (2006.01)
(52) U.S. Cl. ........................................ 423/235; 423/212
(58) Field of Classification Search .................. 423/172, 423/210, 212, 235, 237, 238, 239.1; 422/168, 422/172
 See application file for complete search history.

(56) References Cited

U.S. PATENT DOCUMENTS

| | | | |
|---|---|---|---|
| 3,105,540 A | 10/1963 | Hardgrove | 431/9 |
| 3,528,797 A | 9/1970 | Funk et al. | 71/39 |
| 3,565,575 A | 2/1971 | Warshaww et al. | 23/2 |
| 3,773,897 A | 11/1973 | Fields et al. | 423/235 |
| 3,847,564 A | 11/1974 | Marion et al. | 48/95 |
| 3,860,384 A | 1/1975 | Vulliet et al. | 431/4 |
| 3,900,554 A | 8/1975 | Lyon | 423/235 |
| 3,970,739 A | 7/1976 | Shiraishi et al. | 423/23 S |
| 4,021,188 A | 5/1977 | Yamagishi et al. | 431/158 |
| 4,029,752 A | 6/1977 | Cahn | 423/563 |
| 4,039,446 A | 8/1977 | Ban et al. | 210/688 |
| 4,080,423 A | 3/1978 | Smith et al. | 423/210 |
| 4,089,639 A | 5/1978 | Reed et al. | 431/211 |
| 4,119,702 A | 10/1978 | Azuhata et al. | 423/235 |
| 4,150,631 A | 4/1979 | Frey et al. | 110/186 |
| 4,154,581 A | 5/1979 | Nack et al. | 48/197 R |
| 4,173,454 A | 11/1979 | Heins | 44/522 |
| 4,196,057 A | 4/1980 | May et al. | 205/775.5 |
| 4,208,386 A | 6/1980 | Arand et al. | |
| 4,213,944 A | 7/1980 | Azuhata et al. | 423/235 |
| 4,294,178 A | 10/1981 | Borio et al. | 110/347 |
| 4,325,924 A | 4/1982 | Arand et al. | |
| 4,375,949 A | 3/1983 | Salooja | 431/7 |
| 4,381,718 A | 5/1983 | Carver et al. | 110/347 |
| 4,469,050 A | 9/1984 | Korenberg | 122/4 D |
| 4,502,633 A | 3/1985 | Saxon | 239/422 |
| 4,504,211 A | 3/1985 | Beardmore | 44/604 |
| 4,506,608 A | 3/1985 | Strohmeyer, Jr. | 110/245 |
| 4,507,075 A | 3/1985 | Buss et al. | 421/115 |
| 4,507,269 A | 3/1985 | Dean et al. | 423/235 |
| 4,565,137 A | 1/1986 | Wright | 110/264 |
| 4,584,948 A | 4/1986 | Syred et al. | 110/264 |
| 4,624,840 A | 11/1986 | Dean et al. | 423/235 |
| 4,627,965 A | 12/1986 | Hegemann et al. | 423/242 |
| 4,672,900 A | 6/1987 | Santalla et al. | 431/9 |
| 4,704,084 A | 11/1987 | Liu et al. | 431/7 |
| 4,751,065 A | 6/1988 | Bowers | 423/235 |
| 4,777,024 A | 10/1988 | Epperly et al. | 423/235 |
| 4,780,289 A | 10/1988 | Epperly et al. | 223/235 |
| 4,824,441 A | 4/1989 | Kindig | 44/604 |
| 4,842,834 A | 6/1989 | Burton | |
| 4,873,930 A | 10/1989 | Egense et al. | 110/345 |
| 4,915,036 A | 4/1990 | DeVita | |
| 4,927,612 A | 5/1990 | Bowers | |
| 4,962,711 A | 10/1990 | Yamauchi et al. | 110/347 |
| 4,978,514 A | 12/1990 | Hofmann et al. | 423/235 |
| 4,985,218 A | 1/1991 | DeVita | |
| 4,992,249 A | 2/1991 | Bowers | |
| 5,017,347 A | 5/1991 | Epperly et al. | 423/235 |
| 5,032,154 A | 7/1991 | Wright | 422/109 |
| 5,048,432 A | 9/1991 | Hofmann et al. | 110/345 |
| 5,052,921 A | 10/1991 | Hemsath | 423/121 |
| 5,057,293 A | 10/1991 | Epperly et al. | |
| 5,105,747 A | 4/1992 | Khinkis et al. | 110/345 |
| 5,139,754 A | 8/1992 | Luftglass et al. | 423/235 |
| 5,146,858 A | 9/1992 | Tokuda et al. | 110/261 |
| 4,318,718 A | 3/1993 | Carver et al. | 110/347 |
| 5,240,404 A | 8/1993 | Hemsath et al. | 431/9 |
| 5,261,602 A | 11/1993 | Brent et al. | 239/132.3 |
| 5,286,467 A | 2/1994 | Sun et al. | 423/239.1 |

(Continued)

FOREIGN PATENT DOCUMENTS

DE 28 37 156 A1 3/1979

(Continued)

OTHER PUBLICATIONS

Energy efficiency—our specialty; Mobotec, undated related technology.

(Continued)

*Primary Examiner* — Edward Johnson
(74) *Attorney, Agent, or Firm* — MacCord Mason PLLC

(57) ABSTRACT

An injection device for humidifying a reactor space and injecting and dispersing reagents into the humidified reactor space, including an exterior injection duct for high-velocity gas injection and at least one interior injector for reagent and humidifying agent injection as droplets with a droplet environment. The high-velocity gas ensuring the humidification of the liquid droplet environment and mixing and dispersion of the liquid reagent droplets into the reactor. A multiple injection device system and a method for operating the system are also described.

6 Claims, 13 Drawing Sheets

U.S. PATENT DOCUMENTS

| | | | |
|---|---|---|---|
| 5,310,334 A | 5/1994 | Spiros | 431/5 |
| 5,336,081 A | 8/1994 | Saito et al. | 431/190 |
| 5,342,592 A | 8/1994 | Peter-Hoblyn et al. | |
| 5,345,883 A | 9/1994 | Panos | 110/345 |
| 5,427,828 A | 6/1995 | Park | 95/54 |
| 5,489,419 A | 2/1996 | Diep et al. | 423/235 |
| 5,536,482 A | 7/1996 | Diep et al. | 423/235 |
| 5,585,081 A | 12/1996 | Chu et al. | 423/239.1 |
| 5,690,039 A | 11/1997 | Monroe et al. | 110/264 |
| 5,707,596 A | 1/1998 | Lewandowski et al. | 423/235 |
| 5,728,357 A | 3/1998 | von Harpe | 423/239.1 |
| 5,809,910 A | 9/1998 | Svendssen | |
| 5,853,684 A | 12/1998 | Fang et al. | 423/244.1 |
| 5,854,173 A | 12/1998 | Chang et al. | 502/417 |
| 6,019,068 A | 2/2000 | Tsuo et al. | 122/4 D |
| 6,042,371 A | 3/2000 | Mitani et al. | 431/215 |
| 6,109,911 A | 8/2000 | Tamminen et al. | 431/4 |
| 6,190,628 B1 | 2/2001 | Carter | 422/168 |
| 6,213,032 B1 | 4/2001 | Breen et al. | 110/345 |
| 6,230,664 B1 | 5/2001 | Janka et al. | 112/4 D |
| 6,280,695 B1 | 8/2001 | Lissiamski et al. | 423/239.1 |
| 6,315,551 B1 | 11/2001 | Salzsider et al. | 431/183 |
| 6,357,367 B1 | 3/2002 | Breen et al. | 110/345 |
| 6,398,039 B1 | 6/2002 | Xue et al. | 210/504 |
| 6,485,289 B1 | 11/2002 | Kelly et al. | 431/4 |
| 6,527,828 B2 | 3/2003 | Flippo et al. | 95/54 |
| 6,532,905 B2 | 3/2003 | Belin et al. | 122/4 D |
| 6,818,043 B1 | 11/2004 | Chang et al. | 95/37 |
| 6,953,494 B2 | 10/2005 | Nelson, Jr. | 95/134 |
| 7,198,769 B2 | 4/2007 | Cichanowicz | 423/239.1 |
| 7,335,014 B2 | 2/2008 | Higgins | 431/4 |
| 2003/0110948 A1 | 6/2003 | Gaita et al. | 96/108 |
| 2004/0045437 A1 | 3/2004 | Chang et al. | 95/134 |
| 2004/0120872 A1 | 6/2004 | Fang et al. | 423/239.1 |
| 2004/0185399 A1 | 9/2004 | Moberg | 431/4 |
| 2004/0185401 A1 | 9/2004 | Moberg | 431/9 |
| 2004/0185402 A1 | 9/2004 | Moberg | 431/9 |
| 2004/0253161 A1 | 12/2004 | Higgins | 423/235 |
| 2005/0000901 A1 | 1/2005 | Campbell et al. | 210/660 |
| 2005/0002841 A1 | 1/2005 | Moberg | 423/235 |
| 2005/0013755 A1 | 1/2005 | Higgins | 423/235 |

FOREIGN PATENT DOCUMENTS

| | | |
|---|---|---|
| EP | 0287224 A2 | 10/1988 |
| EP | 0326943 A2 | 1/1989 |
| EP | 0936405 | 8/1999 |
| GB | 2 001 419 A | 5/1978 |
| JP | 53-112273 | 9/1978 |
| WO | WO 87/03507 A1 | 6/1987 |
| WO | WO2005/079305 A3 | 2/2005 |

OTHER PUBLICATIONS

Combined DeNOx/DeSOx and Additional NOx Reduction by Cleaning Flue Gas Condensate From Ammonia; Moberg et al.; presented at PowerGen Int'l., Nov. 30-Dec. 2, 1999.

RJM-LT, "Does This New NOx Control Technology Obsolate SCRs?" RJM Corporation; undated related technology.

COMBUSTION FURNACE HUMIDIFICATION DEVICES, SYSTEMS AND METHODS

This application is a division of utility application Ser. No. 10/757,056 filed Jan. 14, 2004, issued Mar. 2, 2010 as U.S. Pat. No. 7,670,569, which is continuation-in-part of application Ser. No. 10/461,735 filed Jun. 13, 2003, currently pending.

BACKGROUND OF THE INVENTION (1) Field of the Invention

The present invention relates generally to chemical injection devices and, more particularly, to a co-axial chemical injection device using high-velocity gases.

(2) Description of the Prior Art

Combustion furnaces utilize injection of chemical reagents to reduce $NO_x$ and other noxious substances in the combustion effluent. These reagents are frequently dissolved in water and injected into the combustion space under pressure, forming water droplets that aid in the dispersion of the chemical reagents in the combustion gases.

In a low-relative humidity environment, the droplets will start evaporating before they have a chance to reach their boiling point. The droplets will therefore completely evaporate and make the reagent dissolved in the water droplets chemically available much sooner than the time required for the droplets to reach their boiling point. Making the reagent chemically available prematurely may lead to undesirable side reactions. In the case of $NH_3$ and $NH_3$-based reagents that are injected into combustion furnaces in order to react with $NO_x$ compounds to reduce them to elemental nitrogen, premature availability of the $NH_3$ at elevated temperatures can cause them to be oxidized themselves to $NO_x$, thereby actually raising the combustion gas $NO_x$ levels, rather than reducing them.

Prior art methods utilized large droplet sizes to delay the complete evaporation of the droplet and availability of the chemical reagent dissolved therein. However, in high-turbulence systems, droplet sizes are limited by the shear of the gases. Therefore, a need exists for a method to prevent complete evaporation of liquid droplets in a high-turbulence system until complete evaporation is desired.

Chemical injection devices are generally known. Example of some prior art devices include U.S. Pat. No. 5,342,592 issued to Peter-Hoblyn et al. on Aug. 30, 1994 for Lance-type injection apparatus for introducing chemical agents into flue gases teaches the removal of sulfur oxides ($SO_x$) and nitrogen oxides ($NO_x$) from combustion effluents is enhanced by the supplying of reactants in a particular distribution pattern in the gas flow. To achieve the particular distribution pattern and to avoid impingement of the reactant on the heat exchanger tubes of the combustor, an elongated injection lance comprising c cooling jacket and plural spaced injections ports is employed. The cooling jacket protects the reactant supply to the injection ports from the high temperatures of the combustion gases.

U.S. Pat. No. 4,985,218 issued to DeVita on Jan. 15, 1991 for Process and injector for reducing the concentration of pollutants in an effluent teaches a process and apparatus for reducing the concentration of pollutants in an effluent from the combustion of a fuel or waste material is presented. The process and apparatus enables injection of an effluent treatment fluid at low treatment fluid flow rates yet provides an even dispersion of treatment fluid within an effluent passage with little or no clogging. An atomization conduit, positioned coaxially within a treatment fluid supply conduit, extends into the effluent and supplies an atomization fluid, such as steam or air. A treatment fluid is supplied through a supply conduit and through at least one jet in the atomization conduit wall at a velocity of between 2-60 feet per second, causing atomization of the treatment fluid within the nozzle.

U.S. Pat. No. 4,915,036 issued to DeVita on Apr. 10, 1990 for Boiler and injector for reducing the concentration of pollutants in an effluent teaches a process and apparatus for reducing the concentration of pollutants in an effluent from the combustion of a fuel or waste material is presented. The process and apparatus enables injection of an effluent treatment fluid at low treatment fluid flow rates yet provides an even dispersion of treatment fluid within an effluent passage with little or no clogging. An atomization conduit, positioned coaxially within a treatment fluid supply conduit, extends into the effluent and supplies an atomization fluid, such as steam or air. A treatment fluid is supplied through a supply conduit and through at least one jet in the atomization conduit wall at a velocity of between 2-60 feet per second, causing atomization of the treatment fluid within the nozzle.

U.S. Pat. No. 4,842,834 issued to Burton on Jun. 27, 1989 for Process for reducing the concentration of pollutants in an effluent teaches a process and apparatus for reducing the concentration of pollutants in an effluent from the combustion of a fuel is presented. The process and apparatus enables injection of an effluent treatment fluid at independently variable droplet sizes and distance of injection to a wide variety of distribution patterns within an effluent passage. An atomization conduit, positioned coaxially around a treatment fluid conduit, extends into the effluent and supplies an atomization fluid. The supply conduit is axially slidable with respect to the atomization conduit and supplying a treatment fluid through the supply conduit. The relative axial position of supply conduit and the atomization conduit is adjusted and the rate of flow of the atomization fluid is selected to inject droplets of a size effective to a desired distance within the passage.

The use of urea and NH3-generating compounds is known in the prior art. Example of the use of urea and NH3-generating compounds include U.S. Pat. No. 4,992,249 issued Feb. 12, 1991 to Bowers for Reduction of nitrogen- and carbon-based pollutants through the use of urea solutions and U.S. Pat. No. 4,927,612 issued May 22, 1990 invented by Bowers for Reduction of nitrogen- and carbon-based pollutants teaches process using a dispersion of aqueous urea solution is injected into an effluent for reducing nitrogen oxides in an effluent from the combustion of carbonaceous fuel.

U.S. Pat. No. 5,057,293 issued May 22, 1990 invented by Epperly, et al. and assigned to Fuel Tech, Inc. for Multi-stage process for reducing the concentration of pollutants in an effluent teaches a process for the reduction of the concentration of nitrogen oxides in the effluent from the combustion of a carbonaceous fuel, the process comprising selecting a plurality of locations for introduction of chemical formulations and introducing at each of said locations at least one chemical formulation, selected from the group consisting of urea, ammonia, hexamethylenetetraamine, an oxygenated hydrocarbon, a paraffinic hydrocarbon, an olefinic hydrocarbon, an aromatic hydrocarbon, an ammonium salt of an organic acid having a carbon to nitrogen ratio of greater than 1:1, a hydroxy amino hydrocarbon, a heterocyclic hydrocarbon having at least one cyclic oxygen, a five- or six-membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, methyl urea, and mixtures thereof, effective to reduce the concentration of nitrogen oxides at the effluent temperature existing at said location, such that optimization of the level of injection at each of said locations leads to the reduction of the level of nitrogen oxides below a predetermined target level.

U.S. Pat. No. 4,208,386 issued Jun. 17, 1980 to Arand, et al. for Urea reduction of NOx in combustion effluents and U.S. Pat. No. 4,325,924 issued to Arand, et al. on Apr. 20, 1982 for Urea reduction of NO.sub.x in fuel rich combustion effluents teach methods for reducing $NO_x$ in combustion effluents involving introducing urea into the combustion effluent.

SUMMARY OF THE INVENTION

The present invention is directed to an injection device for humidifying a reactor space and injecting and dispersing reagents into the humidified reactor space; the device including an exterior injection duct for high-velocity gas injection and at least one interior injector for reagent and humidifying agent injection; thereby providing a device for ensuring the mixing and dispersion of the liquid reagent into the reactor by the high-velocity gas.

The present invention is further directed to a coaxial injection device for humidifying a reactor space and injecting and dispersing reagents into the humidified reactor space, the device including an exterior duct for high-velocity gas injection, an outer-middle injector with at least one nozzle for liquid injection, an inner-middle duct for low-velocity gas injection and an interior injector with nozzle for liquid injection; wherein the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by interior wall of the outer-middle injector and the exterior wall of the interior injector; the interior injector is formed by a cylinder with an endplate, the endplate having a nozzle; thereby ensuring the mixing and dispersion of the liquids and gases into the reactor to increase reaction homogeneity, reaction efficiency, reactor efficiency and reduced byproduct formation.

The present invention is further directed to a multiple injector system including at least two injection devices, at least one reaction parameter probe, and at least one controller; wherein the coaxial devices are located at spaced-apart locations along the reactor length, the reaction parameter probe is located downstream of the injector system, and the controller communicates with the injection devices and the parameter probe to control the injection devices.

The present invention is still further directed to a method for operating the multiple injector system, including the steps of sampling the reaction parameter; selecting the injection unit best suit for injecting the reagents; and injecting the reagents through the selected injection units.

Accordingly, one aspect of the present invention is to provide an injection device for injecting and dispersing reagents into a reactor, including an exterior duct for high-velocity gas injection, an outer-middle injector with at least one nozzle for liquid injection, an inner-middle duct for low-velocity gas injection and an interior injector with nozzle for liquid injection; wherein, the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by interior wall of the outer-middle injector and the exterior wall of the interior injector; the interior injector is foimed by a cylinder with an endplate, the endplate having a nozzle; thereby ensuring the mixing and dispersion of the liquids and gases into the reactor to increase reaction homogeneity, reaction efficiency, reactor efficiency and reduced byproduct formation.

Another aspect of the present invention is to provide a multiple injection device system including at least two coaxial injection devices and at least 1 reaction parameter probe; wherein the coaxial devices are located at spaced-apart locations along the reactor length and the reaction parameter probe is located downstream of the injector system.

Still another aspect of the present invention is to provide a method for operating the multiple injection device system, including the steps of sampling the reaction parameter; selecting the coaxial injection unit best suited for injecting the reagents; and injecting the reagents through the selected injection units.

These and other aspects of the present invention will become apparent to those skilled in the art after a reading of the following description of the preferred embodiment when considered with the drawings.

DETAILED DESCRIPTION OF THE PREFERRED EMBODIMENTS

Figure 1:
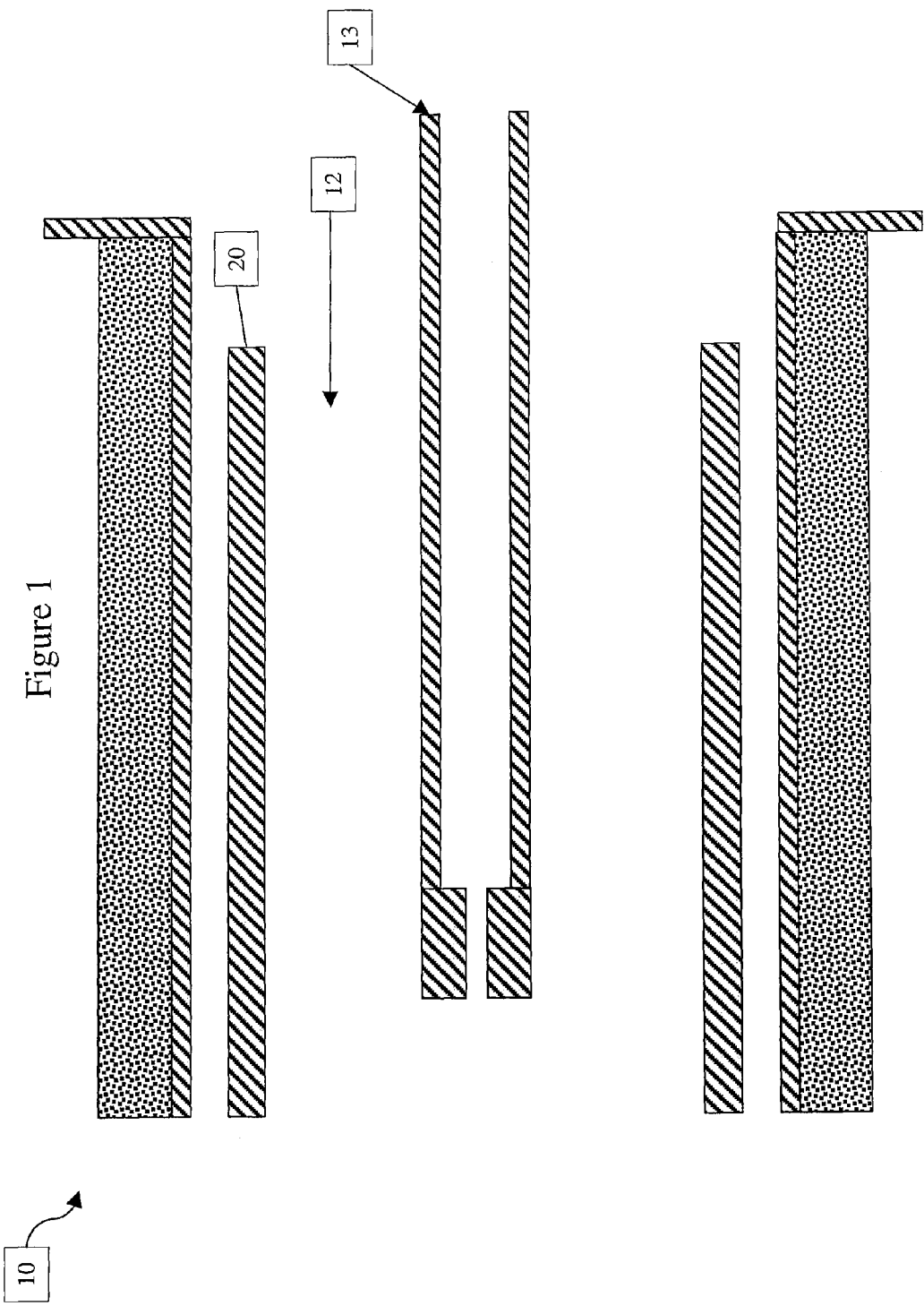
FIG. 1 is a cut-away, side view of an injection device constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. In this description of the embodiment, the term "duct" is used to describe a reagent injection passageway without any constriction on the end. The term "injector" is used to describe a reagent injection passageway with a constrictive orifice on the end. The orifice can be a hole or a nozzle. An injection device is a device that incorporates ducts or injectors or both.

Combined Combustion Furnace Humidification and Reagent Injection Devices and Systems These devices and systems are directed toward the use of humidity to prolong injected droplet life in a combustion furnace. The device is used to raise the relative humidity in the combustion furnace in the droplet environment such that the droplet evaporates more slowly than in a lower-humidity environment. The reagent dissolved in the droplet thus does not become available for reaction until the droplet reaches the desired temperature and/or location in the combustion furnace.

In a low-humidity environment, the droplet may evaporate before it has a chance to reach its boiling point. The reagent dissolved in the water droplet is thereby available to react chemically prior to reaching the desired destination. Making the reagent chemically available prematurely may lead to undesirable side reactions. In the case of NH3 and NH3-based reagents that are injected into combustion furnaces in order to react with $NO_x$ compounds to reduce them to elemental nitrogen, premature availability of the NH3 at elevated temperatures can cause them to be oxidized themselves to $NO_x$, thereby actually raising the combustion gas $NO_x$ levels, rather than reducing them.

A system according to the present invention for the humidification of combustion gases in the proximity of $NO_x$ reducing reagent droplets includes injectors and a control system. The control system includes probes, readouts, circuits, and controlling software.

The humidification injector and reagent injector can be distinct injectors, or the humidifier and reagent can be injected through the same injector. The first configuration allows for adjustment during operation by varying the rate of injection of the humidifier and the reagent individually. The second configuration requires pre-mixing of the humidifier and reagent, but reduces the complexity of the nozzle.

The ROFA duct, humidity injector, and reagent injector are configured in such a manner that the injected humidifier pre-humidifies the space into which the reagent is injected. Therefore, the ROFA duct, humidification injector, and reagent injector are preferably located proximal to one another in the present invention. More preferably, the ROFA duct, humidity injector and the reagent injector are co-axial.

Shown in FIG. 1 is a cut-away, side view of an injection device constructed according to the present invention. The device as shown in FIG. 1, generally referenced as 10, includes an exterior ROFA duct 12 and a combined humidity and reagent injector 13.

ROFA can be injected through the ROFA duct 12 alone or in combination with a sorbent, such as a base, such as alkaline carbonates, such as lime, limestone; hydrated lime; quick lime; soda, trona. Other agents, such as activated charcoal, peroxides, free radicals; NH3; H2O2; urea; and the like, may also be used. Reagents dissolved in a solvent, for example urea dissolved in water, can be injected through the combined humidity and reagent injector 13. Because the ROFA air shears the injected solvent with reagent, the solvent and reagent can be injected through a low-pressure orifice, and does not need to be injected through an atomizing orifice.

Figure 2:
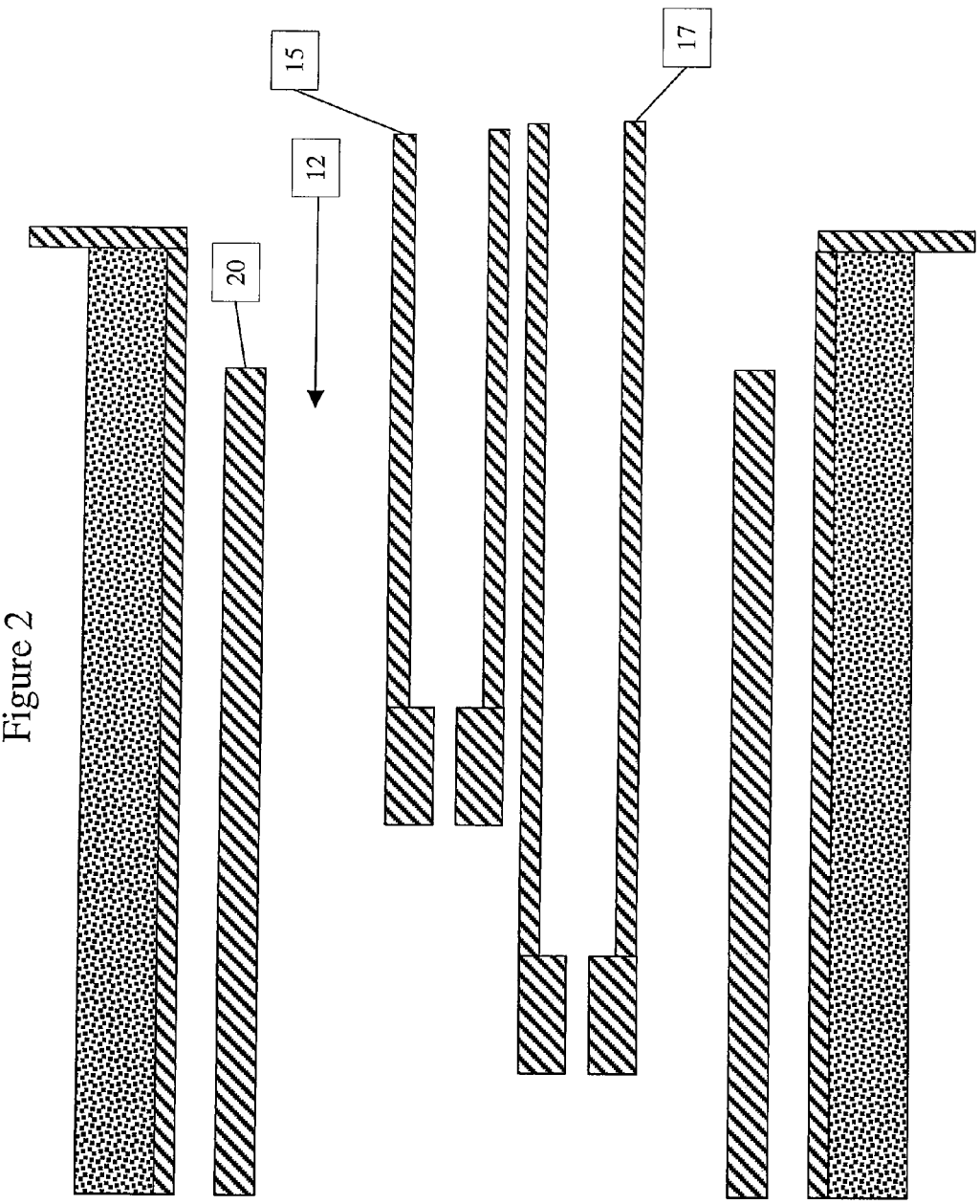
FIG. 2 is a cut-away, side view of another injection device constructed according to the present invention.

FIG. 2 shows a cut-away, side view of another embodiment of the present invention. This embodiment includes a ROFA air duct and a separate humidification injector 15 and reagent injector 17. This embodiment allows the separate injection of the humidification agent and reagent. By separating the injection of the two, the humidification agent can be used to carry another reagent. For example, in a combustion furnace, the humidification agent can be water and the second reagent can be a sorbent. The humidification agent is preferably injected upstream to the reagent, allowing the ROFA air to shear and disperse the humidification agent. The humidification agent, thus dispersed, evaporates and increases the relative humidity of the injection space prior to the injection of the reagent.

Figure 3:
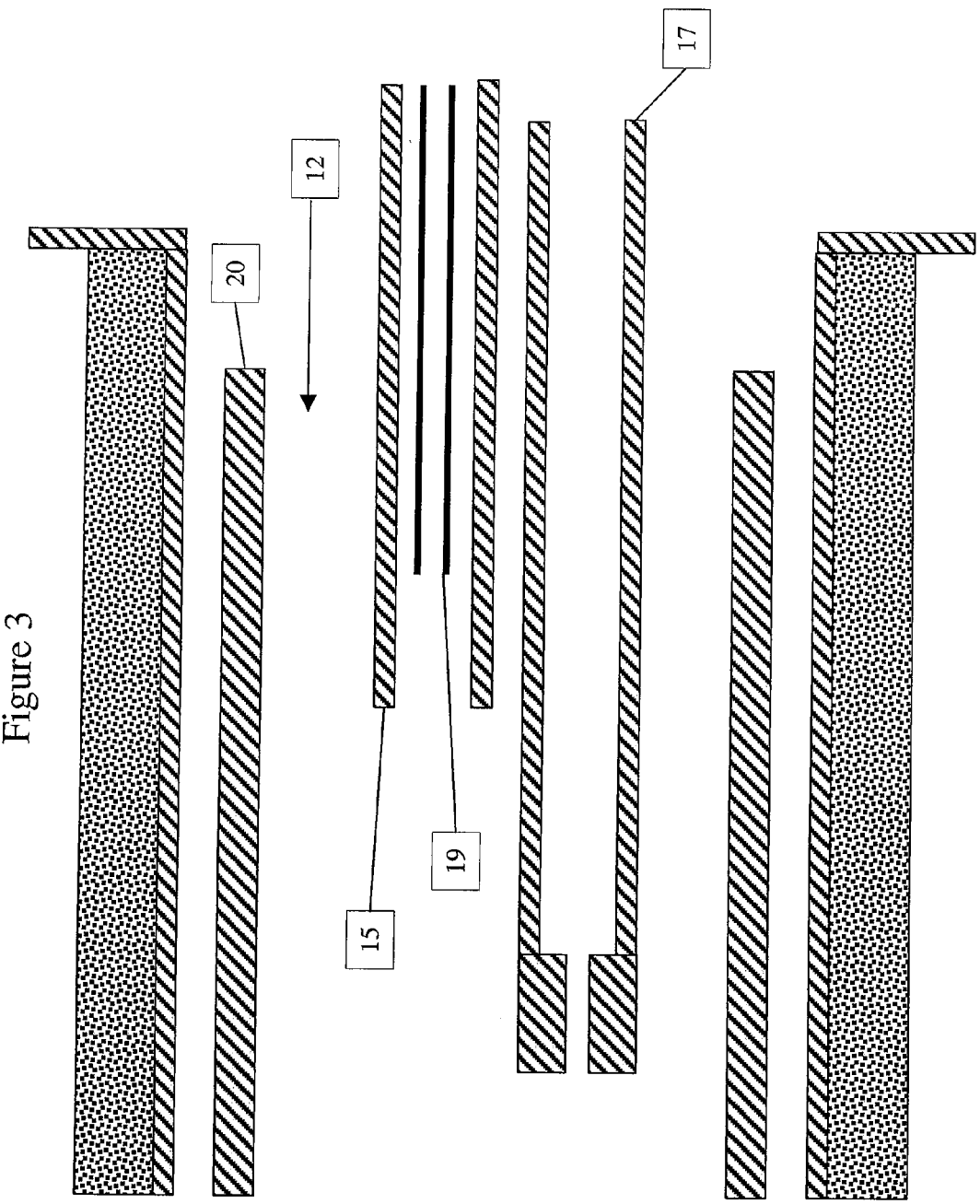
FIG. 3 is a cut-away, side view of yet another injection device constructed according to the present invention.
Figure 4:
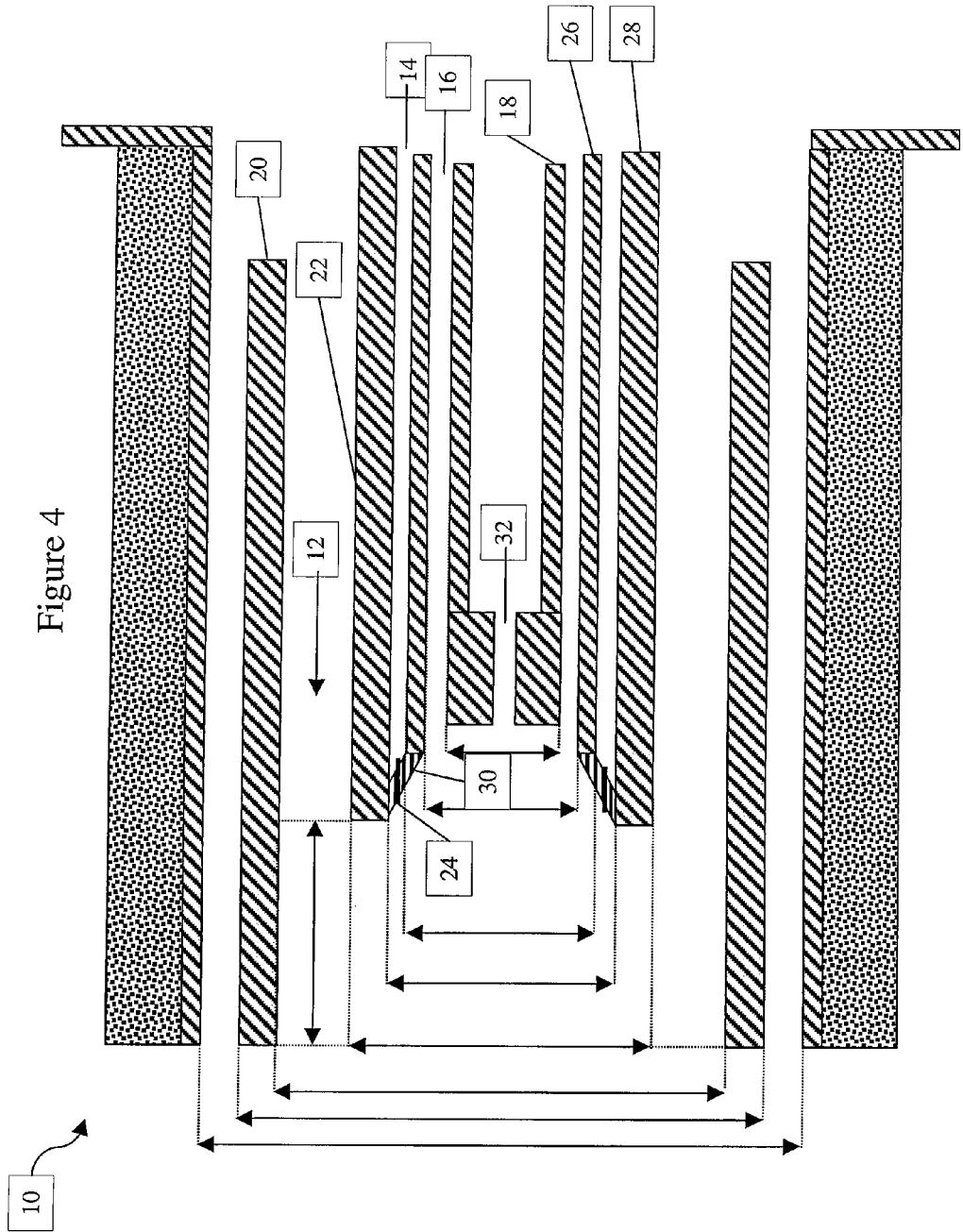
FIG. 4 is a cut-away, side view of yet another injection device constructed according to the present invention.

FIG. 3 is a cut-away, side view of yet another injection device constructed according to the present invention. This embodiment includes a ROFA air duct 12, a reagent injector 17, and a co-axial humidification injector 15 with dispersing air duct 19. In the figure, the dispersing gas duct is internal to the humidification injector; however, the humidification agent can be internal to the dispersing gas. This embodiment allows the reactor operator to vary the dispersion of the humidification reagent.

FIGS. 4, 5, 6, 7, 8, 9, and 10 show an alternative design for a coaxial injection device according to the present invention. The device, generally described as 10, is composed of an exterior duct 12, an outer-middle injector 14, an inner-middle duct 16, and an interior injector 18.

The exterior duct 12, or high-velocity gas duct, is designed for the injection of high-velocity gas in the reactor. For example, ROFA air can be injected into the reactor through the exterior duct for combustion furnaces. The high-velocity gas mixes and disperses material injected through the other ducts and injectors. For example, cooling water, cooling air, and a nitrogenous agent solution injected into combustion gases for the reduction of $NO_x$ are mixed by the ROFA air.

The high-velocity gas disperses solutions without the need for dispersing nozzles; therefore the reactor can use solutions containing particulate. This eliminates or reduces the requirement for pure reagents necessary to prevent obstruction of fine orifices. For example, this device allows the use of low-quality water as cooling water in combustion furnaces, thereby reducing operating expense and improving performance by reducing orifice plugging.

The high-velocity gas duct is formed by the internal wall of the insert 20 and outer cylinder 28 of the outer-middle injector 14. The duct is located externally to and circumferentially surrounds all other injectors and ducts, thereby ensuring the dispersion of all reagents injected through the device. The dispersion improves reaction homogeneity, thereby reducing byproduct formation.

Figure 7:
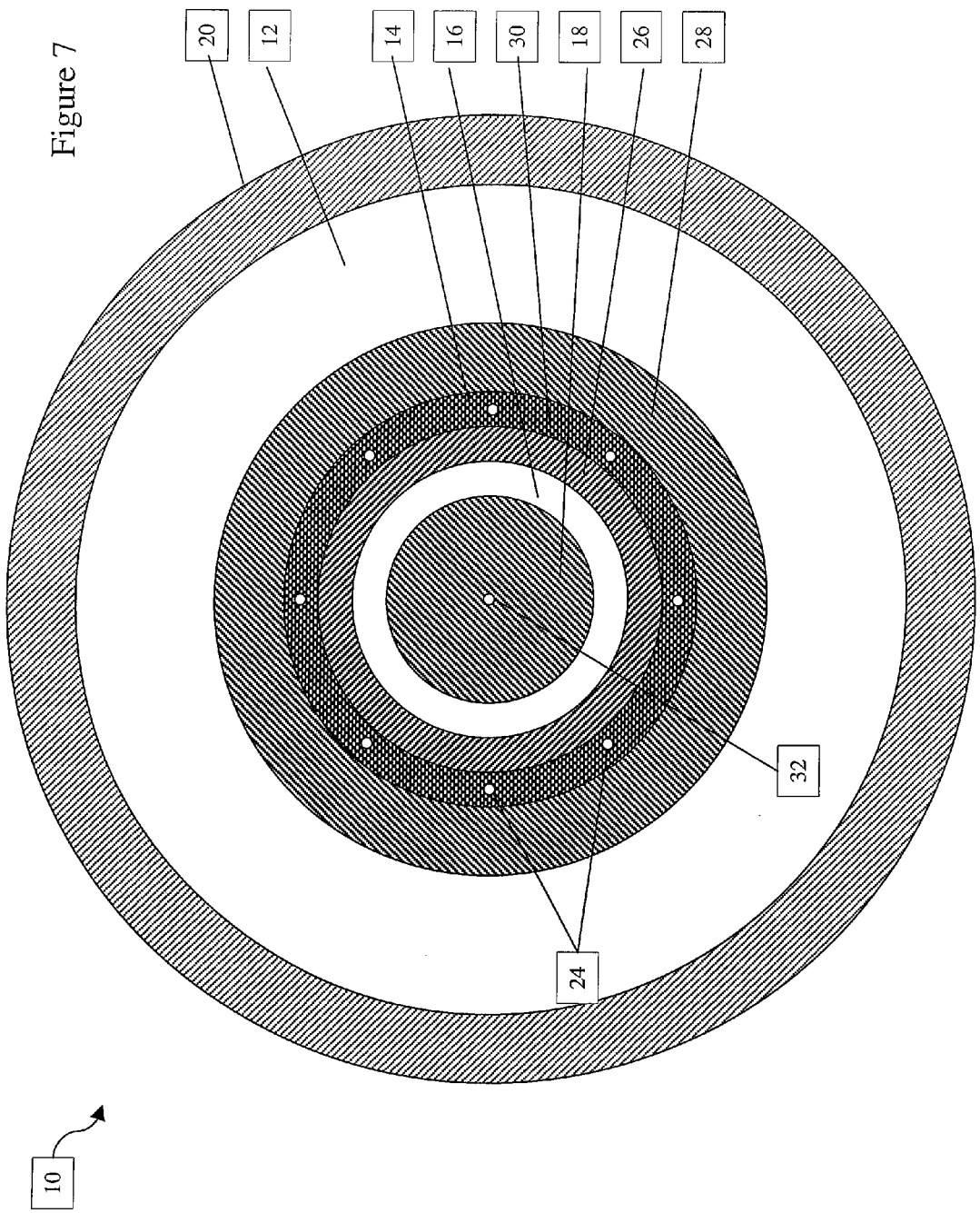
FIG. 7 is a cross-sectional view of a coaxial injection device constructed according to the present invention.
Figure 8:
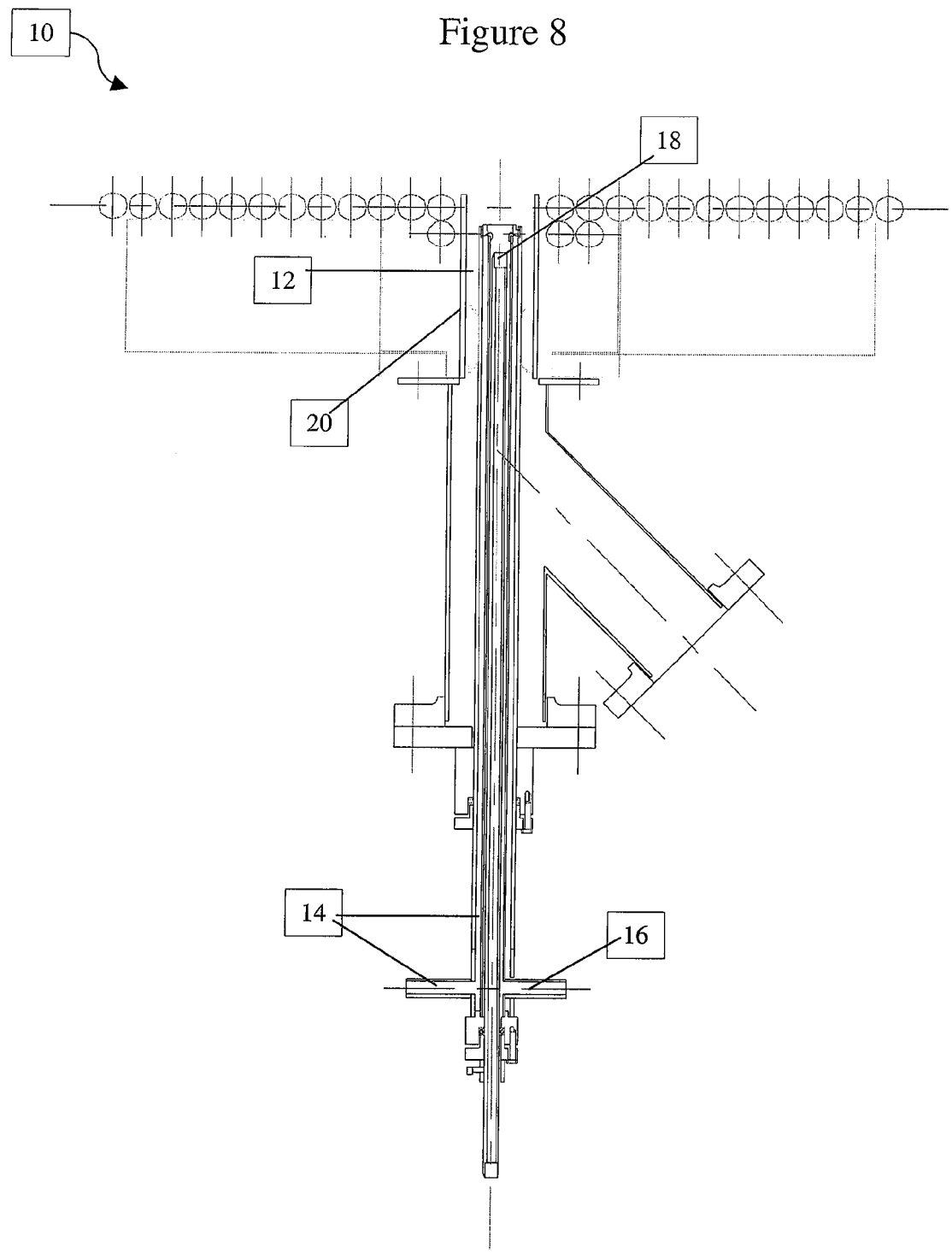
FIG. 8 is a cut-away, side view of a coaxial injection device constructed according to the present invention.
Figure 9:
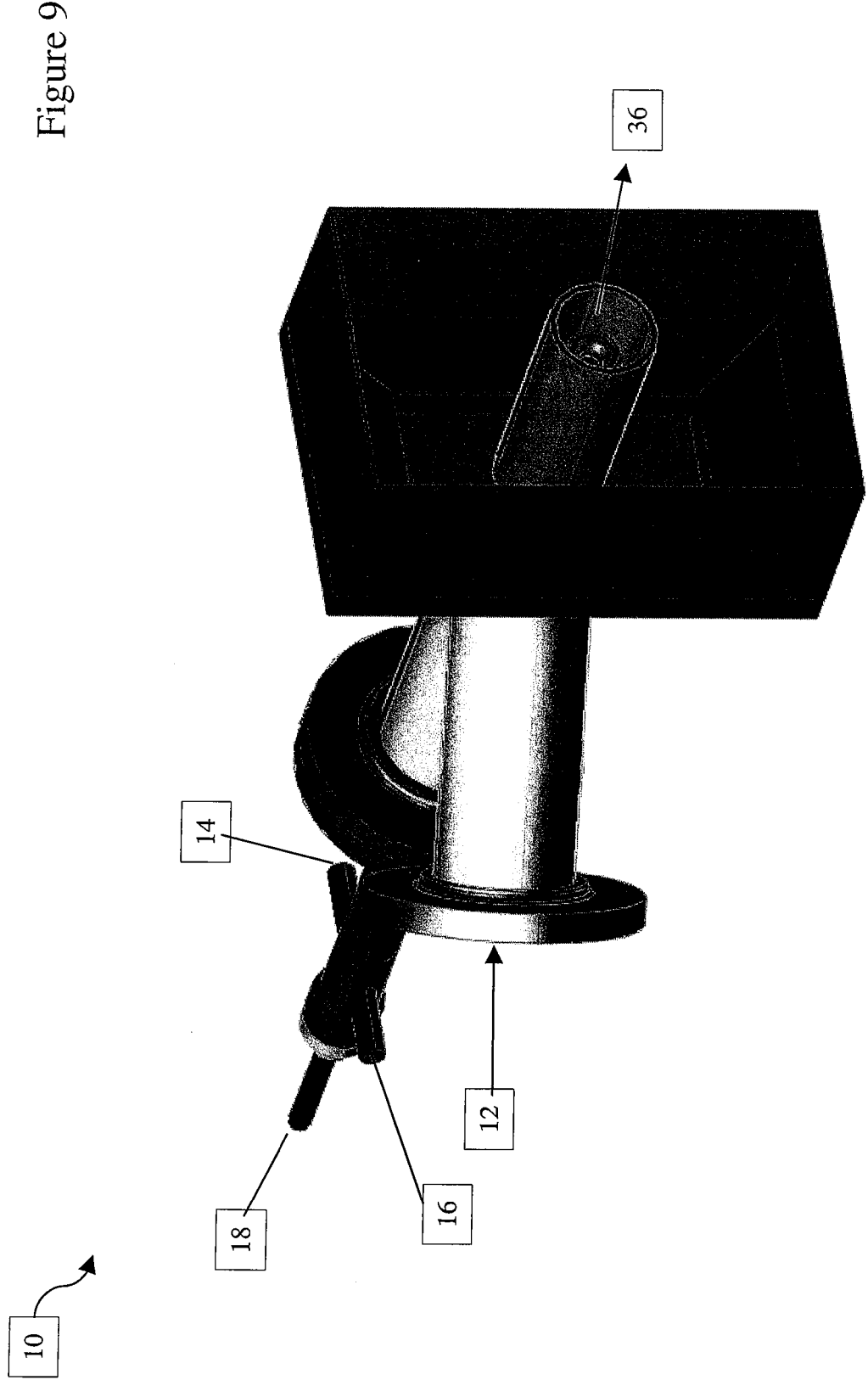
FIG. 9 is a perspective view of the coaxial injection device of FIG. 7.
Figure 10:
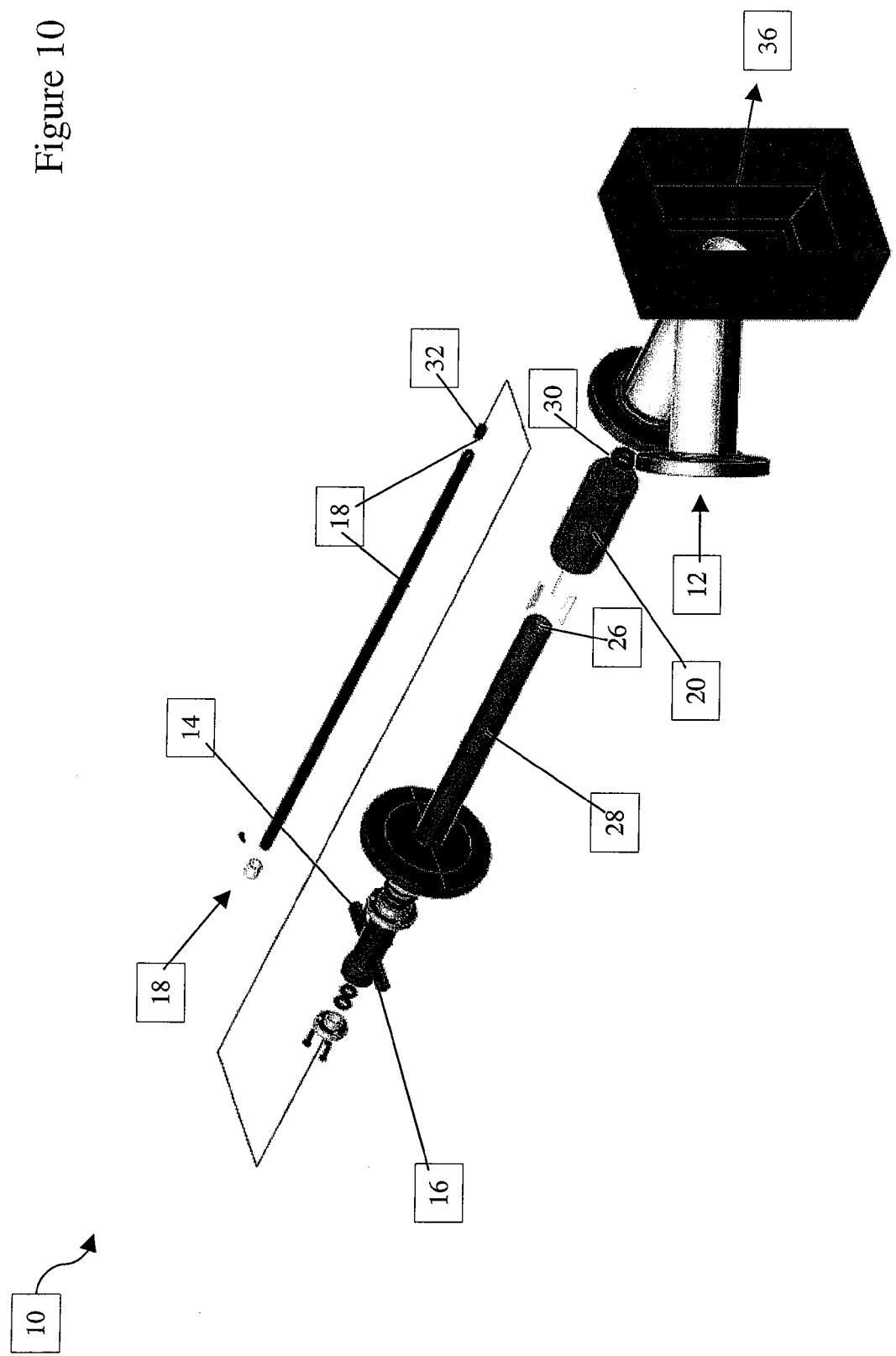
FIG. 10 is a disassembled perspective view of the coaxial injection device of FIGS. 8 and 9.
Figure 11:
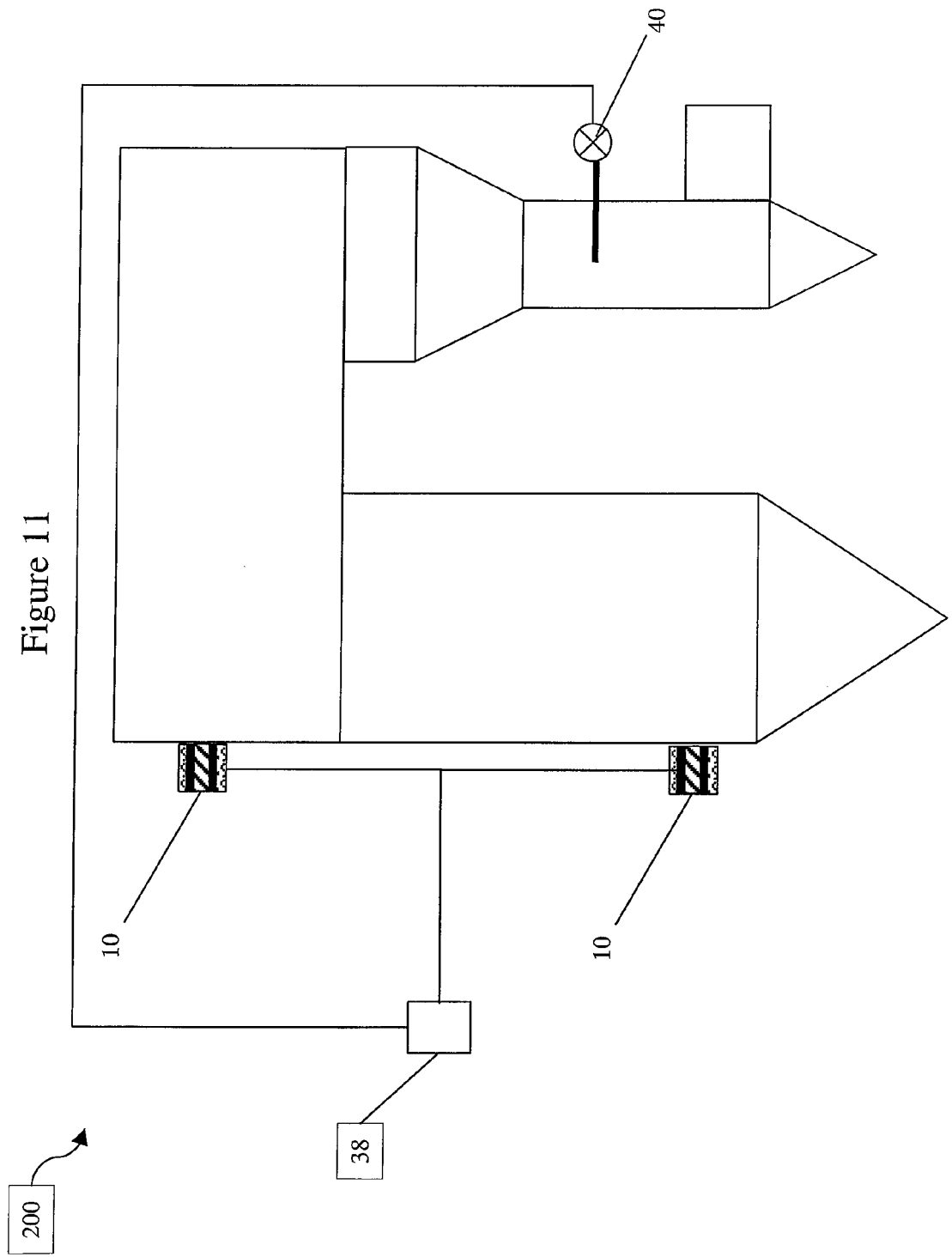
FIG. 11 is a schematic diagram of a system according to the present invention.

Moving inward, the next component of the device is an outer-middle injector 14 with at least one injection orifice 24, such as a hole or nozzle. Preferably, the outer-middle injector has at least 8 nozzles, as shown in FIG. 7. The outer-middle injector is formed by two concentric cylinders 26 and 28 with a connecting end plate 30 and at least 1 injector orifice 24 in the endplate. This device preferably injects a liquid, for example, cooling water for cooling gases in proximity of injected urea droplets can be injected through this injector. The cooling water reduces free radical oxidation of NH3 to $NO_x$ by combustion gases. Alternatively, gases can be injected through this injector. For example, a cooling gas, such as low quality steam that cannot be used for effective power generation, can be injected instead of cooling water into a combustion furnace. Besides the cooling effect, the steam will increase the mass flow and assist the high-velocity gas in carrying and dispersing the other reagents into the furnace.

Moving inward, the next component of the device is an inner-middle duct 16. This duct is formed by the interior cylinder 26 of the outer-middle injector and exterior wall of the interior injector 18. A second gas is preferably injected through this duct. For example, cooling air to keep an injected urea solution cool prior to injection can be injected through this duct. The cooling air prevents urea decomposition prior to injection into the combustion furnace.

The innermost component of the device is an interior injector 18 with constricting orifice 32. The interior injector is preferably formed by a hollow tube with endplate, preferably by a cylinder with endplate. The endplate preferably has a constricting orifice, such as a hole or nozzle. Preferably, liquids are injected into the reactor through this injector. For example, a concentrated nitrogenous agent solution can be injected for the reduction of $NO_x$ in a combustion furnace. The selective non-catalytic reduction (SNCR) of $NO_x$ in the combustion gases thereby reduces acid emissions.

The nitrogenous agent can be selected from the group consisting of urea, ammonia, cyanuric acid, ammonium carbamate, ammonium carbonate, mixtures of ammonia and ammonium bicarbonate, one or more of the hydrolysis products of urea or mixtures or complexes thereof, compounds which produce ammonia as a byproduct, ammonium formate, ammonium oxalate, hexamethylenetetramine, ammonium salts of organic acids, 5- or 6- membered heterocyclic hydrocarbons having at least one cyclic nitrogen, hydroxy amino hydrocarbons, amino acids, proteins, monoethanolamine, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea.

Preferably, the nitrogenous agent is urea. More preferably, the nitrogenous agent is greater than about 20% aqueous urea w/w. Alternatively, more dilute solutions of nitrogenous reagent can be used.

The outer middle injector is preferably recessed in from the edge of the insert to protect the injector orifices from the reaction heat and reactants. The inner injector is recessed within the outer middle inject, to further protect it from the reaction heat and reactants.

High-velocity gas is injected through the exterior duct 12, higher volume liquid is injected through the outer-middle injector 14, lower-volume gas, such as a cooling and/or dispersing gas, is injected through the inner-middle duct 16, and a lower volume liquid is injected through the interior injector 18. The fluids exit the injector and the high-velocity gas disperses the liquids and other gas in the reaction space 36.

Sliding Injectors Embodiment

Figure 5:
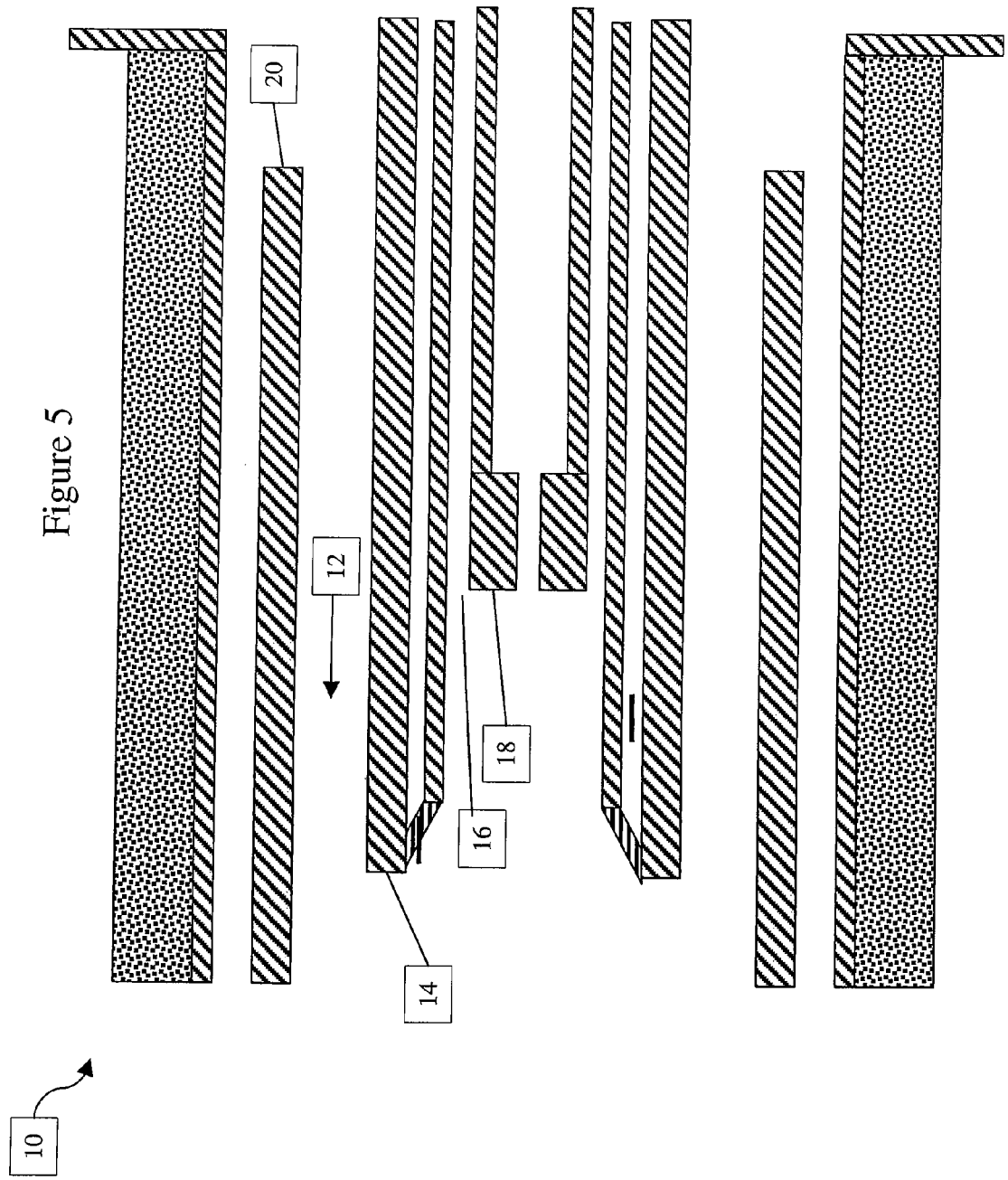
FIG. 5 is a cut-away, side view of the injection device of FIG. 4 in a different configuration.
Figure 6:
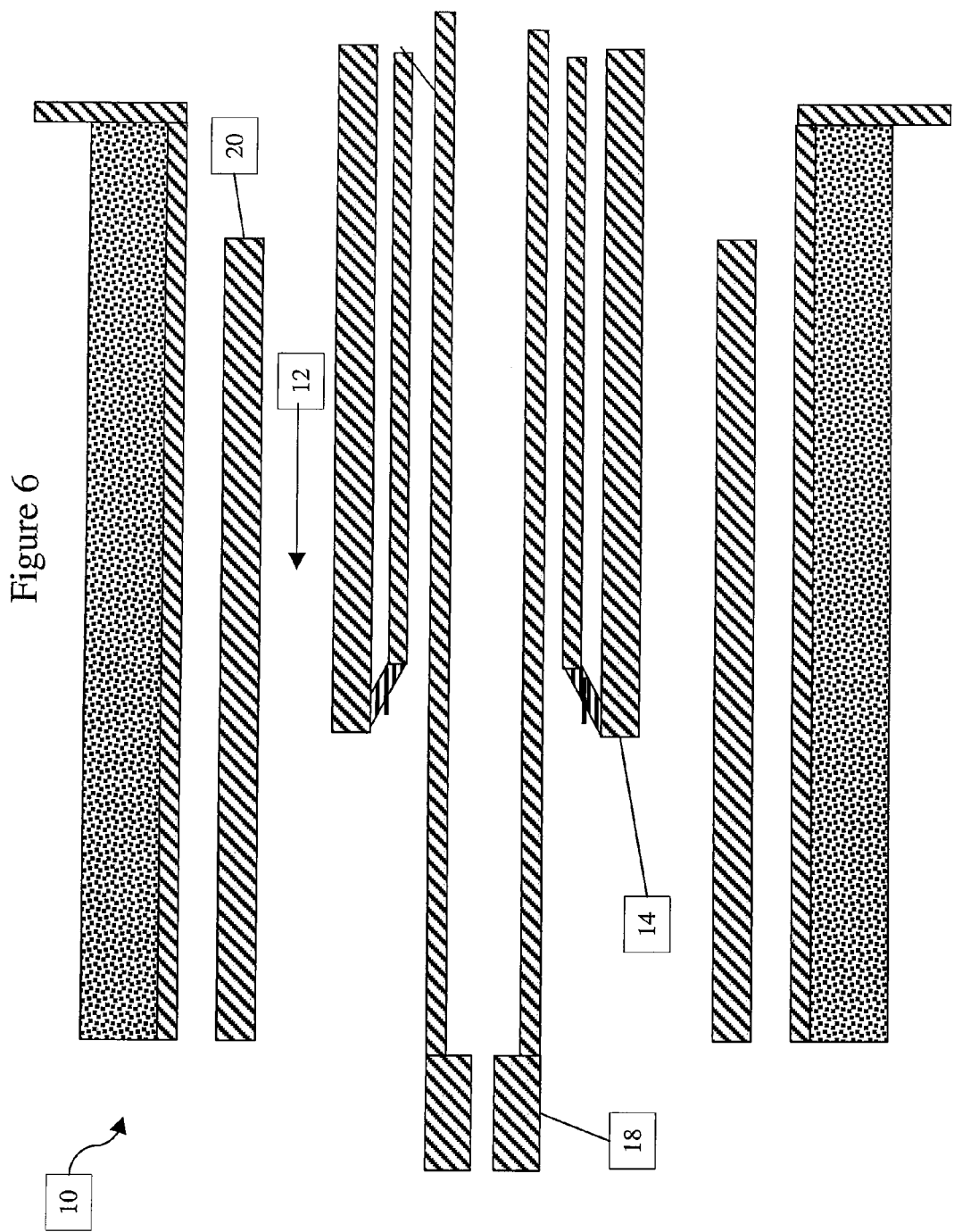
FIG. 6 is a cut-away, side view of the injection device of FIG. 4 in a second different configuration.

The present invention also preferably includes a sliding injector embodiment. In this embodiment, the injectors can be slid toward or away from the reactor space for adjustment. As shown in FIGS. 5 and 6, the internal reagent injector and middle humidification injector are also slid relative to one another, thereby allowing the adjustment of the dispersion and, consequently, the evaporation time for each injected material.

Thus, the co-axial, sliding injector is one in which the interior reagent injector location can be varied with respect to the co-axial humidity injector by sliding the reagent injector along the common axis. This configuration allows for variable temperature and pressure humidification agents to be used because the point of injection of the reagent can be altered to allow the humidification agent time to evaporate prior to the injection of the reagent.

For example, as shown in FIG. 5, the internal reagent injector 18 is slid inward and middle humidification injector 14 is slid outward. FIG. 6 shows the device in an alternate configuration. In this configuration, internal reagent injector 18 is slid outward and middle humidification injector 14 is slid inward. This configuration delays injection of the reagent and allows the humidifying agent more time to evaporate, thereby further ensuring that the reagent is injected into a humidified environment The system thus described allows great flexibility in the characteristics of the liquids used in a process. Because the high-velocity dispersing gas can effectively disperse large droplet size liquids, liquids containing particulates can be used in applications using the present invention, thus eliminating the need for the high-efficiency filtration systems to remove particulates from the liquid, as would be necessary in prior art systems which use dispersing nozzles that are easily obstructed to disperse the fluid.

As shown in FIG. 11, a multiplicity of injection devices 10 according to the present invention can be combined to form a multiple injection system, generally described as 200. The system includes a system controller 38. The multiple injection system can be operated to provide higher efficiency reactions and reduced byproducts. The injection devices can be any of the heretofore described injection devices.

In the embodiment shown in FIG. 11, multiple coaxial injection devices are installed at spaced-apart locations along the reactor length. At least 1 probe 40 is installed downstream of at least one of the injectors of the system. Preferably, the probe is installed downstream of the last injector. In an example embodiment, the injectors are positioned along a combustion furnace and the probe is a temperature probe installed at the end of the combustion chamber.

The present invention is thus directed to a multiple injector system including at least two coaxial injection devices, at least one reaction parameter probe, and at least one controller; wherein the coaxial devices are located at spaced-apart locations along the reactor length, the reaction parameter probe is located downstream of the injector system, and the controller communicates with the injection devices and the parameter probe to control the injection devices. The parameter probed can include temperature, pH, relative humidity, chemical species, gas velocity, and the like. Chemical species probes preferably include $NO_x$, $SO_x$, and NH3 probes. Line-of-sight measurement techniques may also be used. Combinations of probes and techniques are also used.

The controller is preferably any of a number of standard flow controllers. A preferred embodiment includes a high-level control that uses fuzzy logic, artificial intelligence, closed loop processes, and the like. An alternative embodiment includes an open loop manual controller.

A method of using the multiple coaxial injection system includes the following steps:

1) measuring reactor parameter;
2) selecting the coaxial injection device most suitable for injecting the secondary reagent; and
3) injecting the secondary reagent through the selected coaxial injection devices.

An optional step includes flushing deselected coaxial injection devices with a cleaning fluid to prevent fouling.

Thus, present invention includes an injection device for humidifying and dispersing reagents into a reactor space, including an exterior injection duct for injecting at least one gas at high-velocity into the reactor space; at least one interior injector for injecting at least one reagent and at least one humidifying agent into the reactor space; wherein the at least one interior injector is positioned coaxially inside the exterior injection duct for injecting, mixing, and dispersing the at least one reagent and the at least one humidifying agent in the reactor space; thereby ensuring the mixing and dispersion of the at least one reagent and the at least one humidifying agent into the reactor by the high-velocity gas. The at least one interior injector preferably includes at least one humidifying agent injector and at least one reagent injector for injecting respective at least one humidifying agent and at least one reagent, separately. The at least one humidifying agent injector further preferably includes a coaxial dispersing gas duct. The injection device is even more preferably a coaxial injector device including an exterior duct for high-velocity gas injection; an outer-middle injector for liquid injection; an inner-middle duct for low-velocity gas injection; and an interior injector for liquid injection; wherein the injectors and ducts are positioned coaxially; and wherein, the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by interior wall of the outer-middle injector and the exterior wall of the interior injector; the interior injector is formed by a cylinder with an endplate, the endplate having a nozzle.

In the injection device, at least one interior injector is slideable relative to the exterior injector to adjust the position of an injection end of the at least one interior injector with respect to a reactor end of the exterior duct for providing controllable proximity of injection into the reactor space. The injection end and reactor end are the ends closest to the reactor space and through which the injected reagent and ducted gas material respectively exit the injection device.

A multiple injection device system according to the present invention includes at least two injection devices as previously described, at least one reaction parameter probe, and at least one controller; wherein the injection devices are located at spaced-apart locations along a reactor length; the at least one reaction parameter probe is located downstream of the injector devices; and the at least one controller communicates with the injection devices and the at least one reaction parameter probe to control the injection devices for providing controlled injecting, mixing, and dispersing the at least one reagent and the at least one humidifying agent in the reactor space. The at least one reaction parameter probe preferably measures at least one parameter selected from the group consisting of temperature, pH, relative humidity, chemical species, gas velocity, and combinations thereof. Preferably, at least one injection device injects at least one $NO_x$-reducing reagent and at least one injection device injects at least one $SO_x$-reducing agent. Even more preferably, at least one injection device injects both at least one $NO_x$-reducing reagent and at least one $SO_x$-reducing reagent.

In a preferred embodiment, the at least one interior injector is slidable relative to the exterior injector to adjust the position an injection end of the at least one interior injector with respect to a reactor end of the exterior duct for providing controllable proximity of injection into the reactor space.

A method for operating the system preferably includes the steps of:
 sampling the reaction parameter;
 selecting at least one injection device best suited for injecting a reagent for affecting a chemical reaction within the reactor to produce a desired result from the reaction;
 injecting the secondary reagent through the at least one selected injection device.

A method for reducing the $NO_x$ in a combustion effluent preferably includes the steps of:
 providing a system as previously described;
 sampling the effluent temperature;
 selecting at least one injection device best suited for injecting an NH3-generating reagent for reducing $NO_x$ in the effluent;
 injecting the NH3-generating reagent through the at least one selected injection device.

In a preferred embodiment, the $NH_3$-generating reagent is selected from the group consisting of: urea, ammonia, cyanuric acid, ammonium carbamate, ammonium carbonate, mixtures of ammonia and ammonium bicarbonate, one or more of the hydrolysis products of urea or mixtures or complexes thereof, compounds which produce ammonia as a byproduct, ammonium formate, ammonium oxalate, hexamethylenetetramine, ammonium salts of organic acids, 5- or 6-membered heterocyclic hydrocarbons having at least one cyclic nitrogen, hydroxy amino hydrocarbons, amino acids, proteins, monoethanolamine, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and combinations thereof.

Injected fluids preferably include high-velocity secondary air, cooling water, cooling air, and urea solution in the exterior duct, outer-middle injector, inner-middle duct, and interior injector, respectively, for the reduction of $NO_x$ in a combustion process.

Another embodiment of the present invention is an injection device for humidifying a reactor space including an exterior injection duct for injecting at least one gas at high-velocity into the reactor space; at least one interior injector for injecting at least one humidifying agent into the reactor space; wherein the at least one interior injector is positioned coaxially inside the exterior injection duct for injecting, mixing, and dispersing the at least one humidifying agent, thereby ensuring mixing and dispersing of the least one humidifying agent into the reactor by the high-velocity gas. Preferably, the at least one interior injector is slidable relative to the exterior injector to adjust the position an injection end of the at least one interior injector with respect to a reactor end of the exterior duct for providing controllable proximity of injection into the reactor space.

Certain modifications and improvements will occur to those skilled in the art upon a reading of the foregoing description. For example, the device according to the present invention provides for large diameter orifices for introducing alternative NH3 sources, such as algae, which grows in the cooling ponds of the power generation facilities. All modifications and improvements have been deleted herein for the sake of conciseness and readability but are properly within the scope of the following claims.

EXAMPLE(S)

This section outlines an example of a system operated using the present invention, not necessarily optimized, but illustrative of a humidification method according to the present invention.

Example 1

A specific example of the reduction of $NO_x$ in a combustion furnace using urea with a co-axial device according to the present invention follows:

A combustion furnace operating at approximately 1300 degrees C. was fitted with devices according to the present invention in a manner to produce ROFA conditions inside the combustion space. The pressure of the injected high-velocity ROFA air was adjusted to between about 1 and about 20 bar relative to the combustion space to provide sufficient mass flow to ensure adequate turbulence for mixing and heat exchange. A greater than 20% urea solution was injected through the inner injector at a stoichiometric rate of from about 0.1 to about 6.0 $NH3/NO_x$ ratio. Greater $NO_x$ reduction was achieved with a $NH3/NO_x$ ratio between about 1 and about 2. Cooling water was injected at about 0.5 to about 40H2O/NH3 ratio. Greater reduction in $NO_x$ was achieved with a H2O/NH3 ratio between about 1 to about 6. The temperature of the cooling air was maintained below 100 degrees C. and the velocity was maintained above about 2 m/s to ensure that the urea solution was not boiling in the inner injector.

The system thus described was successful in reducing $NO_x$ output approximately 40% versus the prior operation regimen.

Thus, a method for reducing the $NO_x$ in a combustion effluent, includes the steps of: providing a multiple coaxial injection system according to the present invention; sampling the effluent temperature; selecting at least one of the coaxial injection devices best suit for injecting an NH3-generating reagent; and injecting the NH3-generating reagent through the selected coaxial injection units.

Example 2

A trial of the present invention in specific regard to $NO_x$ reduction was performed at an operating power station. The trial included a test of the humidification method and devices. The power station was a mid-sized four corner fired unit (also known as a tangentially-fired or t-fired unit) capable of producing 79 MW at maximum load. At this facility there are two units that share a common stack, and only one of the units was treated. The $NO_x$ measurements were taken in the stack. Therefore, analysis of the data must take into account the $NO_x$ production and load from each unit simultaneously.

The test was performed with a 40% w/w solution of urea. The urea was not diluted. The source of water for the humidification/cooling was potable water from the plant water tank. Both the urea and the humidification/cooling water were pumped through conventional pump skids into the control cabinets.

Figure 12:
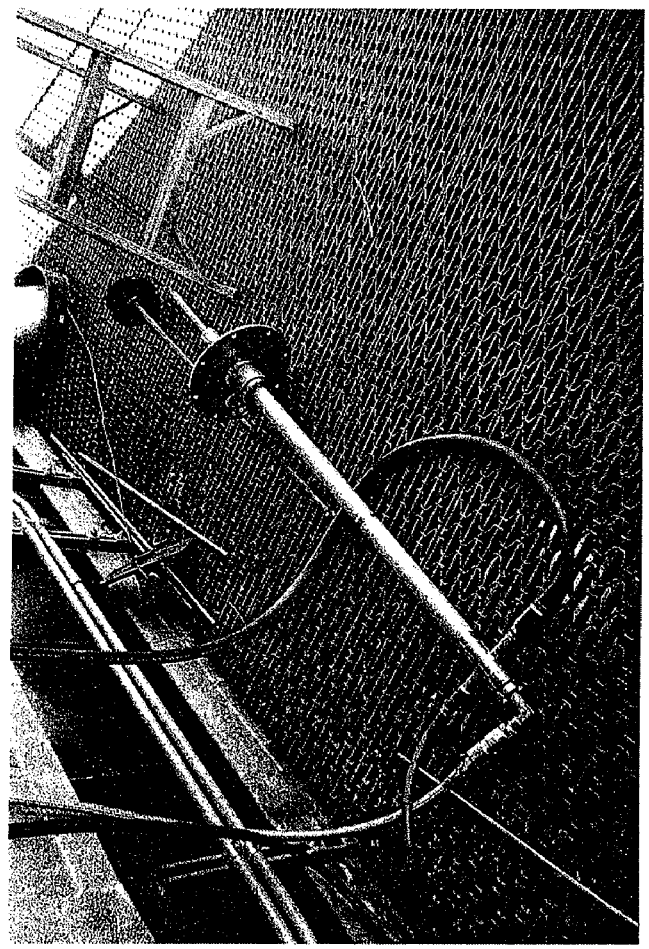
FIG. 12 is a photograph of a co-axial injector according to the present invention.
Figure 13:
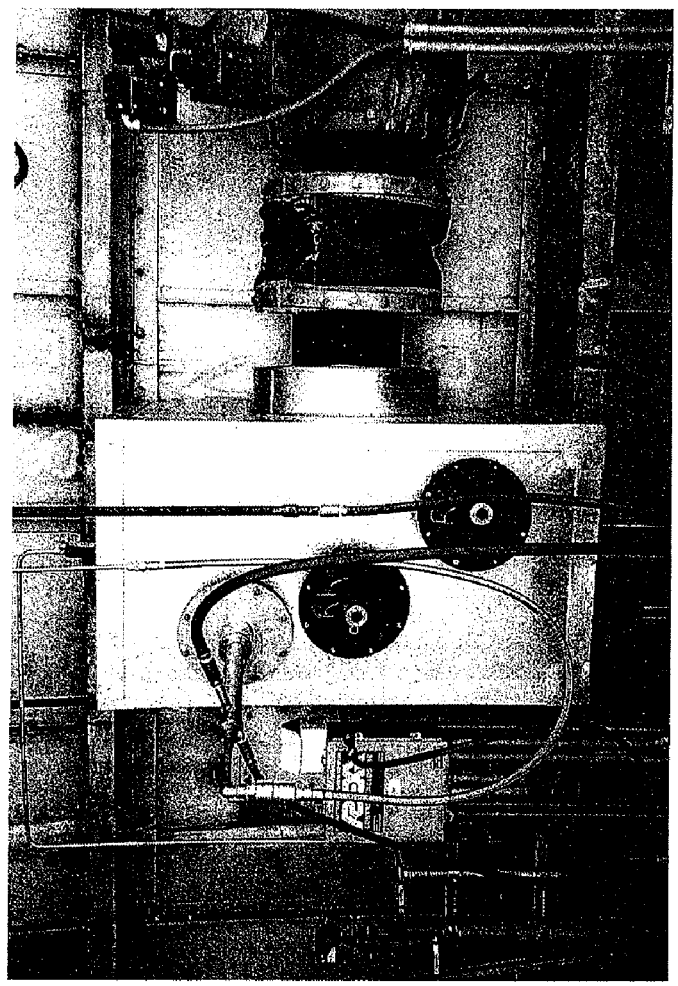
FIG. 13 is a photograph of a co-axial injector according to the present invention installed in a port of a ROFA box.

The devices, as shown in FIG. 12, were hooked up to the urea, humidification/cooling water and air lines. The 40% w/w solution of urea entered through the SS braided center lance connection, humidification/cooling water through the left hand hose and air through the right hand hose. The lances were installed in the upper ports (RR and RL) of the two upper boxes, as shown in FIG. 13.

The unit load was 47 MW at Unit 1 and 72 MW at Unit 2. The reading from a common stack CEM meter was used to determine if $NO_x$ reductions occurred during the trial. Base $NO_x$ levels were 0.427 lb/MMBtu with Unit 1 at 47 MW and Unit 2 at 72 MW.

Four tests were run. The first was with the unit uncontrolled (baseline). The second was with the ROFA system in operation, but with no urea injection or humidification. The third was with the urea injection and with humidification through one nozzle/lance only (RR). The fourth was with urea injection and with humidification through two nozzles/lances (RR and RL). The results are presented in the following table.

TABLE 1

| | Time | $NO_x$ (lb/MMBtu) | Unit 1 Load (MW) | Unit 2 Load (MW) |
|---|---|---|---|---|
| Uncontrolled | 11:00 | .427 | 47 | 72 |
| ROFA | 12:15 | .362 | 47 | 72 |
| Rotamix (RR lance only) | 13:17 | .300 | 47 | 72 |
| Rotamix (RR and RL lances) | 14:20 | .248 | 46 | 72 |

To understand the affect of the humidification on Unit 1, we need to correct for the emissions from Unit 2. From the EPA database, we can assume that the Unit 2 $NO_x$ emissions were 0.37 lb/MMBtu at 72 MW. From this we can calculate the $NO_x$ emissions from Unit 1. These estimates are shown in following table. Of note, when one lance is in service, the total NOx reduction increases from 33% with ROFA only to 63% with ROFA/Rotamix. The addition of another lance further increases NOx reduction to 88%. Reduction from Rotamix over ROFA is 83%, using both lances.

TABLE 2

| | Time | Estimated Unit 1 NOx (lb/MMBtu) | Reduction from Uncontrolled | Reduction from ROFA |
|---|---|---|---|---|
| Uncontrolled | 11:00 | 0.52 | — | — |
| ROFA | 12:15 | 0.35 | 33% | — |
| Rotamix (RR lance only) | 13:17 | 0.19 | 63% | 46% |
| Rotamix (RR and RL lances) | 14:20 | 0.06 | 88% | 83% |

What is claimed is:

1. A method for operating a combustion system comprising at least two injection devices, at least one downstream reaction parameter probe, and at least one controller in communication with the at least two injection devices and the at least one probe, wherein the at least two injection devices each comprise an exterior injection duct for injecting at least one gas at high-velocity into the reactor space, at least one interior injector for injecting at least one reagent and at least one humidifying agent into the reactor space; wherein the at least one interior injector is positioned coaxially inside the exterior injection duct for injecting, mixing, and dispersing the at least one reagent and the at least one humidifying agent in the reactor space, the method comprising the steps of:
    sampling a reaction parameter;
    selecting at least one injection device for injecting a reagent for affecting a chemical reaction within the reactor to produce a reduction in at least one compound in an effluent; and
    injecting a reagent and a humidifying agent through the interior injector of the at least one selected injection device.

2. A method for reducing the NOx in a combustion effluent, comprising the steps of:
    providing a combustion system comprising at least two injection devices, at least one downstream reaction parameter probe, and at least one controller in communication with the at least two injection devices and the at least one probe, wherein the at least two injection devices each comprise an exterior injection duct for injecting at least one gas at high-velocity into the reactor space, at least one interior injector for injecting at least one reagent and at least one humidifying agent into the reactor space; wherein the at least one interior injector is positioned coaxially inside the exterior injection duct for injecting, mixing, and dispersing the at least one reagent and the at least one humidifying agent in the reactor space;

sampling the effluent temperature;

selecting at least one injection device for injecting an NH3-generating reagent for reducing $NO_x$ in the effluent;

injecting the NH3-generating reagent through the interior injector of the at least one selected injection device.

3. The method of claim 2, wherein the $NH_3$-generating reagent includes urea.

4. The method of claim 2, wherein the $NH_3$-generating reagent includes at least one reagent selected from the group including:

urea, ammonia, cyanuric acid, ammonium carbamate, ammonium carbonate, mixtures of ammonia and ammonium bicarbonate, one or more of the hydrolysis products of urea or mixtures or complexes thereof, compounds which produce ammonia as a byproduct, ammonium formate, ammonium oxalate, hexamethylenetetramine, ammonium salts of organic acids, 5- or 6-membered heterocyclic hydrocarbons having at least one cyclic nitrogen, hydroxy aminohydrocarbons, amino acids, proteins, monoethanolamine, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and combinations thereof.

5. The method of claim 2, wherein the at least two injection devices each comprise the exterior duct for high-velocity gas injection; an outer-middle injector for liquid injection; an inner-middle duct for low-velocity gas injection; and the interior injector for liquid injection; wherein the injectors and ducts are positioned coaxially; and wherein, the exterior duct is formed by the internal wall of an insert and the external wall of the outer-middle injector; and is located externally to and circumferentially surrounds all other injectors and ducts; the outer-middle injector is formed by two concentric cylinders with end plate and injector nozzles; the inner-middle duct is formed by the interior wall of the outer-middle injector and the exterior wall of the interior injector; the interior injector is formed by a cylinder with an endplate, the endplate having a nozzle.

6. The method of claim 5, wherein injected fluids include high-velocity secondary air, cooling water, cooling air, and urea solution in the exterior duct, outer-middle injector, inner-middle duct, and interior injector, respectively, for the reduction of NOx in a combustion process.

* * * * *